United States Patent [19]

Ferraroni

[11] Patent Number: 4,776,457

[45] Date of Patent: Oct. 11, 1988

[54] COMPARTMENTED DISPLAY CONTAINER WITH PIVOTED COVER SUPPORT

[75] Inventor: Silvano Ferraroni, Reggio Emilia, Italy

[73] Assignee: Mass Plast S.r.l., Reggio Emilia, Italy

[21] Appl. No.: 76,795

[22] Filed: Jul. 23, 1987

[30] Foreign Application Priority Data

Sep. 16, 1986 [IT] Italy ............................... 34877 B/86

[51] Int. Cl.⁴ .............................................. B65D 85/57
[52] U.S. Cl. .................... 206/45.23; 40/391; 40/405; 206/45; 206/444; 211/40; 220/22.5; 220/335; 220/338; 220/342; 312/193
[58] Field of Search ............... 206/444, 309, 311, 312, 206/425, 44.11, 45, 45.14, 45.17, 45.2, 45.23, 45.24, 45.18; 40/124.2, 391, 405, 537; 211/40; 220/22.1, 338, 342, 343, 335, 22, 22.5; 312/183, 185, 187, 188, 193

[56] References Cited

U.S. PATENT DOCUMENTS

| | | | |
|---|---|---|---|
| 1,339,194 | 5/1920 | Grammich | 206/45.23 |
| 4,598,824 | 7/1986 | Long et al. | 206/444 |
| 4,615,445 | 10/1986 | Stocchiero | 206/444 |
| 4,629,067 | 12/1986 | Parlik et al. | 206/425 |
| 4,640,416 | 2/1987 | Northup et al. | 220/338 |
| 4,676,372 | 6/1987 | Rager | 206/45.23 |
| 4,706,813 | 11/1987 | Schneider et al. | 220/338 X |

Primary Examiner—Stephen Marcus
Assistant Examiner—Bryon Gehman
Attorney, Agent, or Firm—Bucknam and Archer

[57] ABSTRACT

The container-classifier comprises a container body (1) of relatively flat form for containing the articles; a cover (2) is hinged to the upper end of the body (1); the cover (2) and body (1) are hinged together in such a manner as to enable the cover (2) to rotate rearwards from the position (A) through an angle greater than 180 degrees so as to bring the cover (2) into a position (B) in which it rests on a support surface by way of its lower end and supports the body (1) in a stable inclined position, in which the open face of the body (1) is in view.

8 Claims, 8 Drawing Sheets

COMPARTMENTED DISPLAY CONTAINER WITH PIVOTED COVER SUPPORT

This invention relates to a container-classifier for flat objects, in particular for computer disks.

An object of the invention is to provide a container-classifier in which the objects are presented in a position comfortable to the user, by virtue of their being all simultaneously in view and by being extractable and insertable comfortably and rapidly.

A further object of the invention is to provide a container-classifier in which the cover can be comfortably raised into a stable position so as to leave the container body open.

A further object of the invention is to provide a container-classifier which besides having the aforesaid advantages is also of both simple manufacture and valid operation.

These and further objects are attained by the invention as characterised in the claims.

The invention is described hereinafter with the aid of the accompanying drawings, which illustrate some preferred but not exclusive embodiments thereof.

In the aforesaid figures, the reference numeral 1 indicates overall the container body for containing the objects, in particular computer disks.

Figure 1:
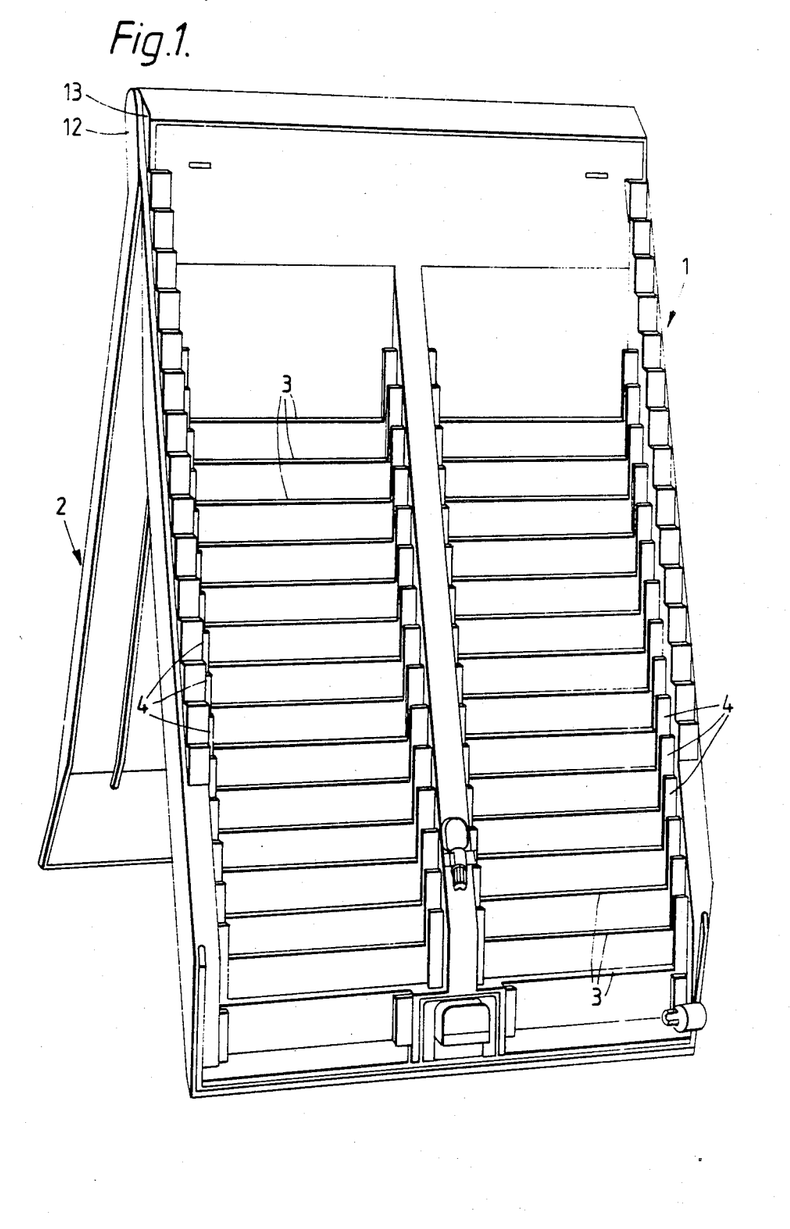
FIG. 1 is a ¾ front perspective view of a first embodiment of the container-classifier according to the invention.
Figures 2, 2A:
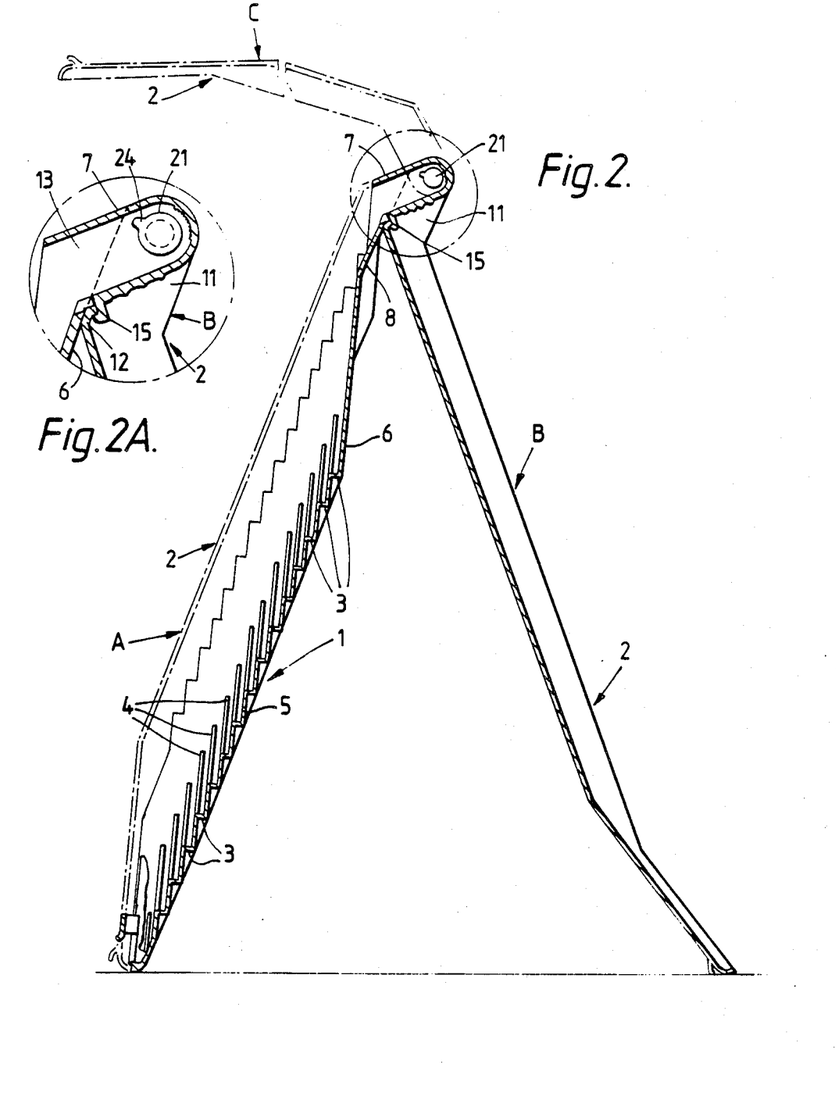
FIG. 2 is a section on the vertical plane of symmetry through the container-classifier of FIG. 1.
FIG. 2A shows an enlarged detail of FIG. 2.

The container body 1 is of relatively flat form and, in the embodiment illustrated in FIGS. 1 and 2, comprises various small disk compartments disposed stepwise in two stepped rows. The compartments are defined by a like number of steps 3 which act as a support for the lower side of the disks, and by thin walls 4 to the side of the steps 3, against which the disk faces rest. The disks when inserted into said compartments all have their upper edge simultaneously in view.

The container-classifier also comprises a cover, indicated overall by 2, to cover the container body 1.

The cover 2 is hinged to the upper end of the container body 1 in such a manner as to enable the cover to rotate rearwards from its closure position (indicated by A in FIG. 2) through an angle exceeding 180 degrees. This final position is indicated by B in FIG. 2, and corresponds to a rotation of about 300 degrees. When the cover 2 is in said position B it rests with its lower edge on a support surface (the term "support surface" signifying the resting surface, typically the surface of a desk or table, on which the container-classifier is placed) and supports the container body in an inclined position, forming therewith a structure in the shape of a step-ladder, with the open face of the body 1 in view.

In correspondence with its upper end, the container body 1 comprises a concave portion 7 having a cylindrical lateral surface with a profile in the shape of a rectangle surmounted by a semicircle. The portion 7 extends beyond the base surface 5 of the container body and projects upwards and rearwards, inclined at about 45 degrees to the closure position A. The lower end of the concave portion 7 extends to rest in the same plane as that in which the base surface 5 rests.

The base surface 5 comprises a central part which is flat overall, and an upper portion 6 inclined forwards and upwards followed by a horizontal portion 8 joined to said portion 7.

The cover 2 comprises two lateral lugs 11 located in correspondence with its upper edge, and by means of which the upper end of the container body 1 is hinged. Specifically, the lugs 11 are pivoted to the flat lateral walls 13 of the concave portion 7.

The upper edge 12 of the cover 2 abuts against the base surface 5 when the cover is in the position B in which it rests on a support surface. Specifically, the edge 12 abuts against the base surface 5 in proximity to the region in which said concave portion 7 joins the remaining part of the container body 1, ie against the portion 8.

By virtue of this configuration, the cover 2 acts both as a cover, when in its closure position A, for the container body 1, and as a support, when in the position B, to keep the container body 1 inclined so that this latter is presented to the user in a position which is extremely comfortable both for viewing all the objects simultaneously and for extracting them from and returning them to the container-classifier.

Figure 3:
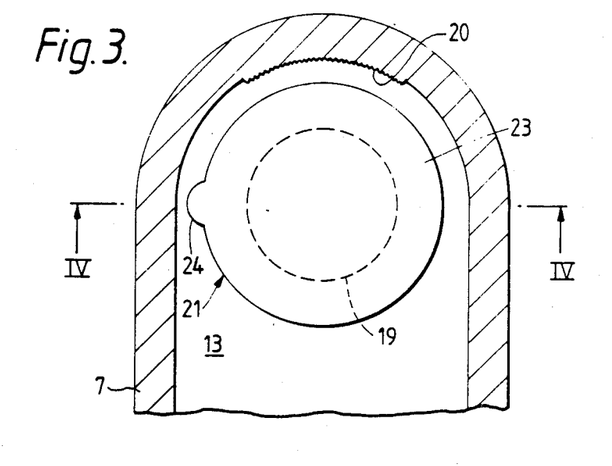
FIG. 3 shows an enlarged detail of FIG. 2A.

The container-classifier also comprises suitable means for stabilising the position B of the cover 2. These means comprise one or more small hooks 15 of elastically flexible material joined to the base surface 5 in the region in which the cover 2 abuts against this surface, that is in the region in which the portion 7 joins the portion 8. The hooks 15 project from the surface 5 and are disposed in such a position that their ends intercept the trajectory of the edge 12 of the cover 2. They also project towards said edge 2 in order to hook it, and oppose rotation of the cover 2 in the opposite direction. When the cover 2 is moved into position B, its edge 12 flexes the hooks 15 without difficulty. In contrast, the shape of the hooks 15 is such as to oppose with greater resistance any rotation of the cover 2 in the opposite direction, so that this latter remains in position B in a sufficiently stable manner.

Figure 4:
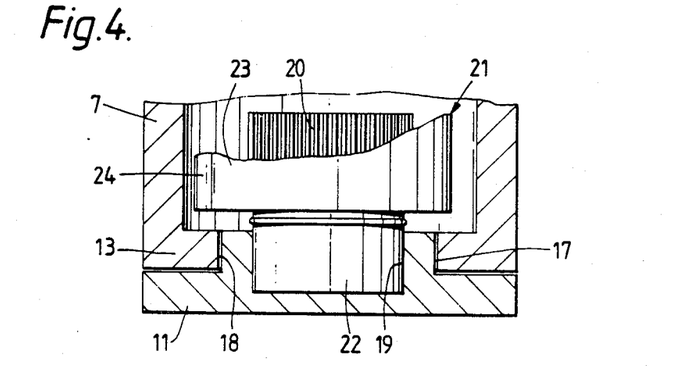
FIG. 4 is a section on the plane IV—IV of FIG. 3.

The cover 2 is hinged to the body 1 by two coaxial rotary pairs. Each pair comprises a bearing element in the form of a through hole 18 provided in each of the two flat lateral walls 13, and a pivot element 17 rigid with the lugs 11 of the cover 2 and provided with an axial bore 19, it being inserted with an exact fit into the hole 18. Said pair also comprises a circular cylindrical surface portion 20 rigid with the lateral wall 13 and disposed in proximity to the through hole 18, its generating lines being parallel to the axis of the rotary pair and being disposed concentrically to the hole 18. Said surface portion 20 is advantageously provided on the circular cylindrical surface of the concave portion 7.

Each pair also comprises a stop element 21 formed from a first portion 22 and a second portion 23, both of which are cylindrical. The first portion 22 is inserted with a force fit into the bore 19 and rotates rigidly therewith by being for example coupled thereto by means of a key. The second portion 23, of greater diameter than the first, prevents axial withdrawal of the pivot element 17 from the hole 18. On the cylindrical surface of the portion 23 there is provided a radial projection 24 which makes friction contact with said cylindrical surface portion 20 when the cover is raised through a range of about 90 degrees from its closure position A. On rotating the cover 2, when the projection 24 makes contact with the surface portion 20 the friction created between these elements maintains the cover in a relatively stable position (indicated by C in FIG. 2).

In the embodiment shown in FIGS. 5–10, the container body (1) differs from the embodiment described heretofore, whereas the cover 2, its connections to the body 1 and its method of operation are substantially unchanged.

Figure 5:
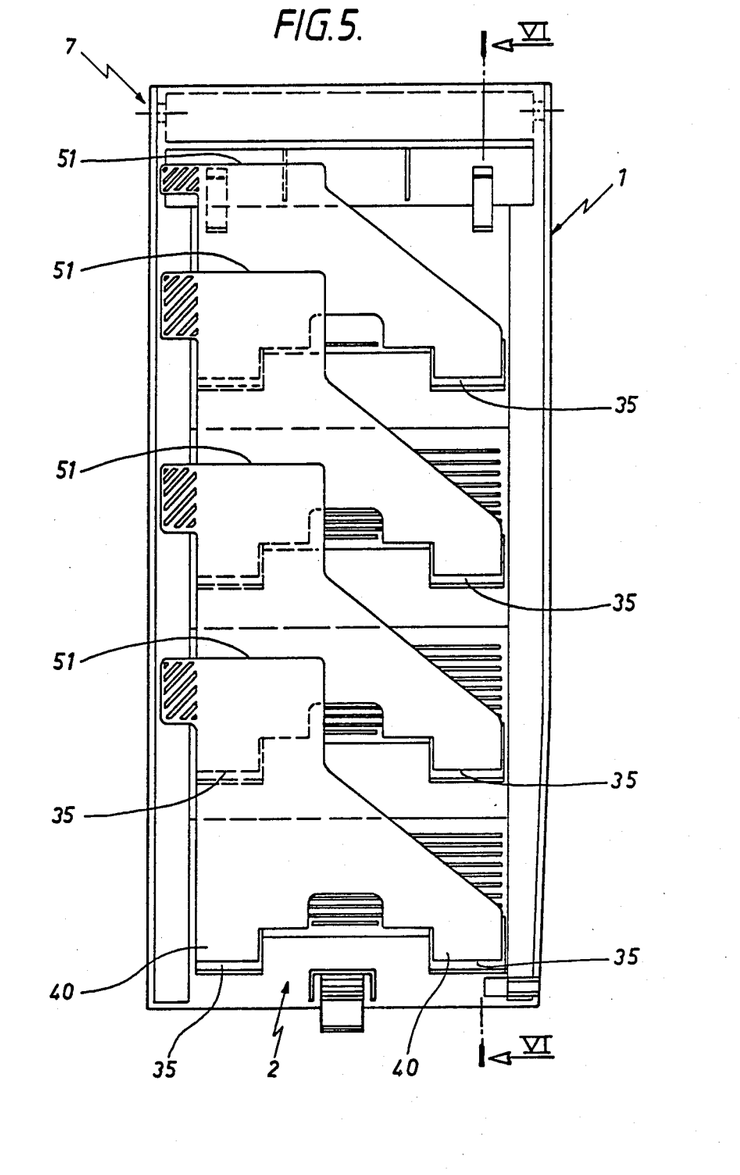
FIG. 5 is a front view of a second embodiment of the invention.
Figure 10:
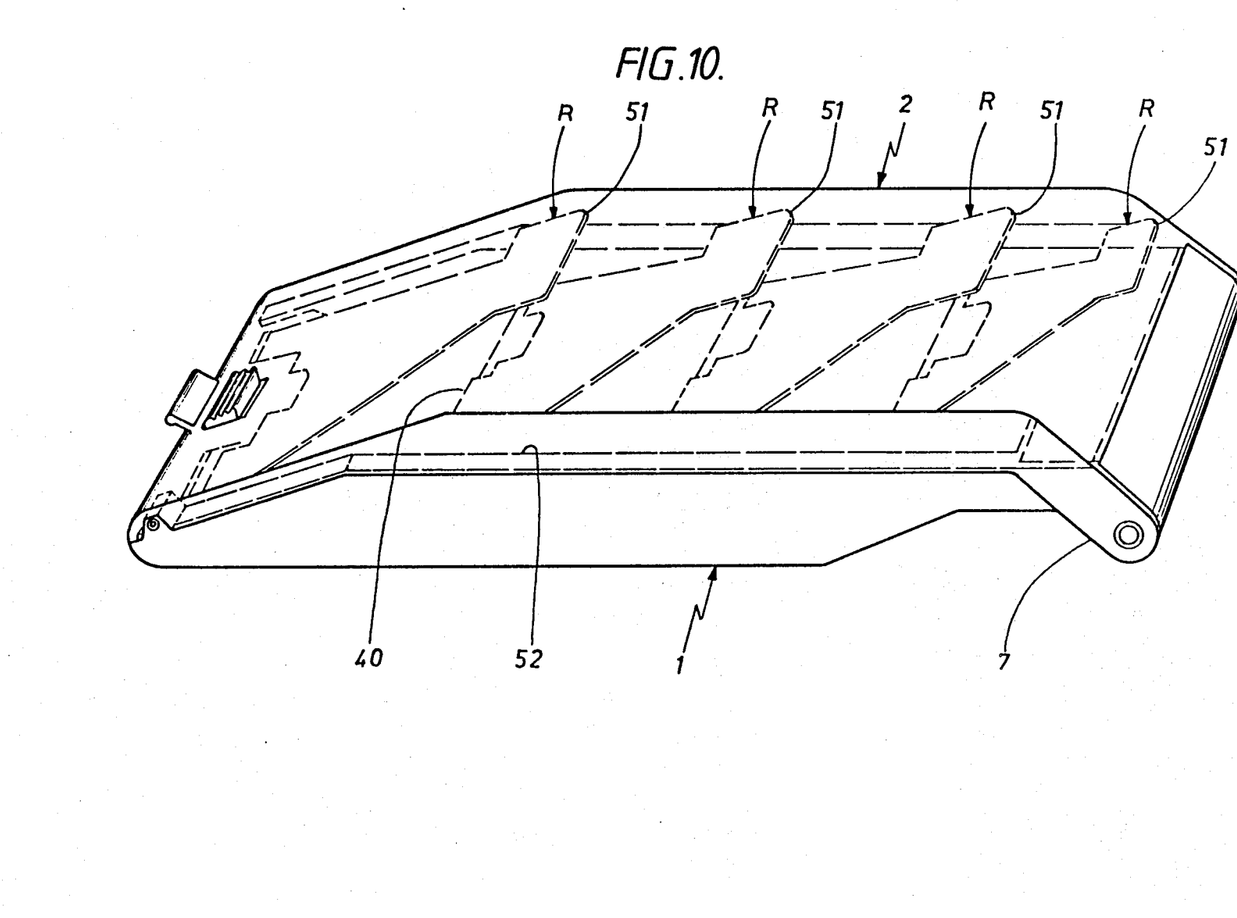
FIG. 10 is a perspective view of the invention shown in FIG. 5.

In this embodiment the body 1 is of substantially flat form and comprises one or more thin baffles 51 arranged to define several compartments in the container body 1. Specifically, in the illustrated embodiment, four equidistant baffles 51 are provided to define a like number of compartments into which the disks or other objects can be inserted in an ordered manner.

Figure 6:
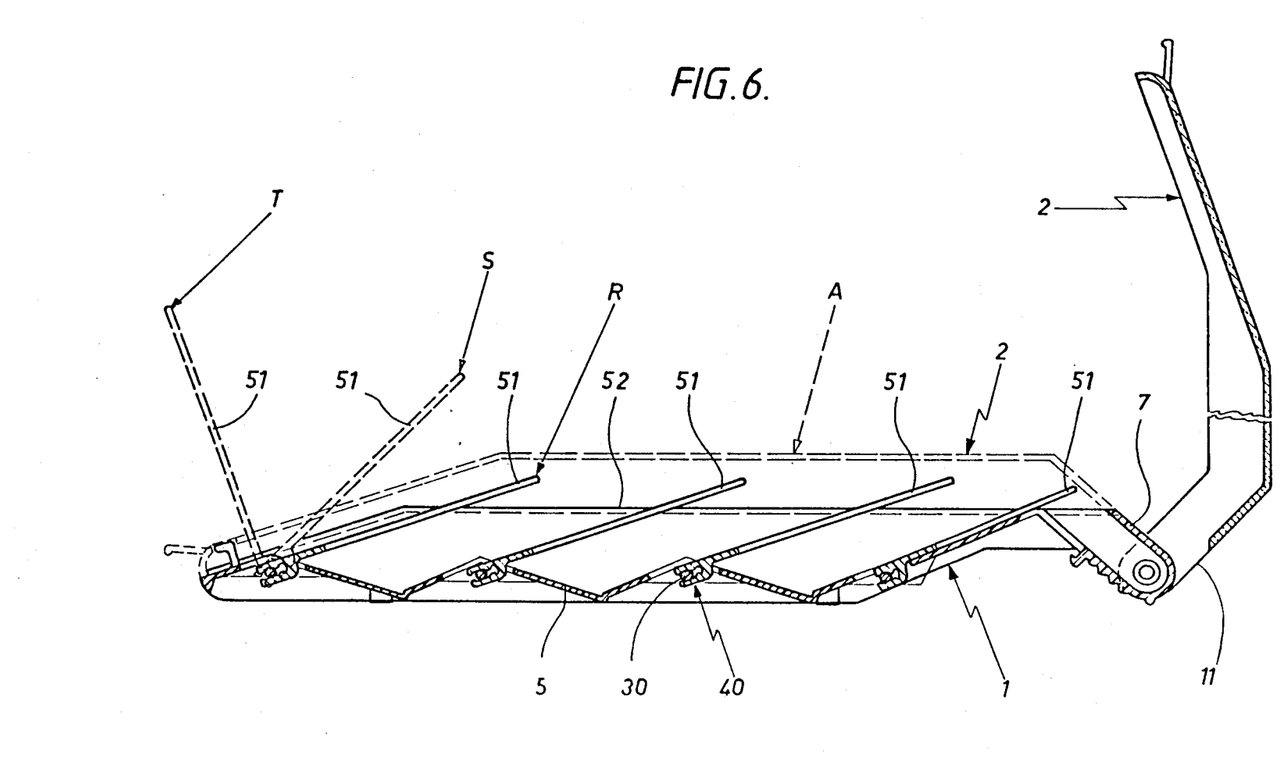
FIG. 6 is a section on the plane VI—VI of FIG. 5 in which the container-classifier is shown in a horizontal position.

The base surface 5 has a cross-sectional zig-zag profile to define various steps for storing the objects in stepped formation. The baffles 51 are disposed on the convex vertices of the steps.

The baffles 51 are hinged along respective horizontal axes disposed on the base 5 of the body 1, and can assume several stable angular positions in addition to the position R in which they rest on the objects or on the front edge 52 of the body 1 to enable the container to be closed. In particular, these include a first stable position S, for example rotated through 30–60 degrees from the position R, and a second stable position T, further rotated through about 90 degrees from the position S.

Figure 7:
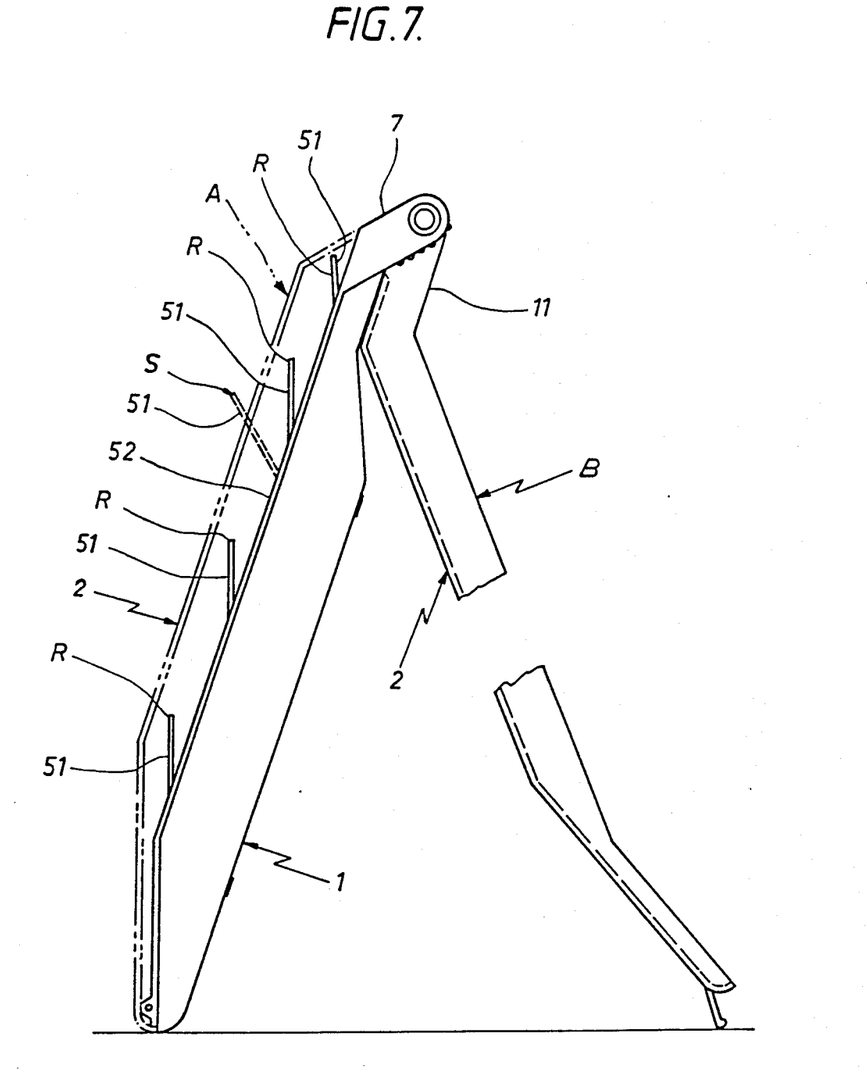
FIG. 7 is a side view of the invention of FIG. 5 "standing up".

The position S is useful in particular when the container is placed "standing up" (as shown in FIG. 7) in order to widen the compartments and facilitate the introduction, extraction and viewing of the objects disposed in the compartments.

The position T serves the same purpose, in particular when the container is in a horizontal position (as shown in FIG. 6).

Figure 8:
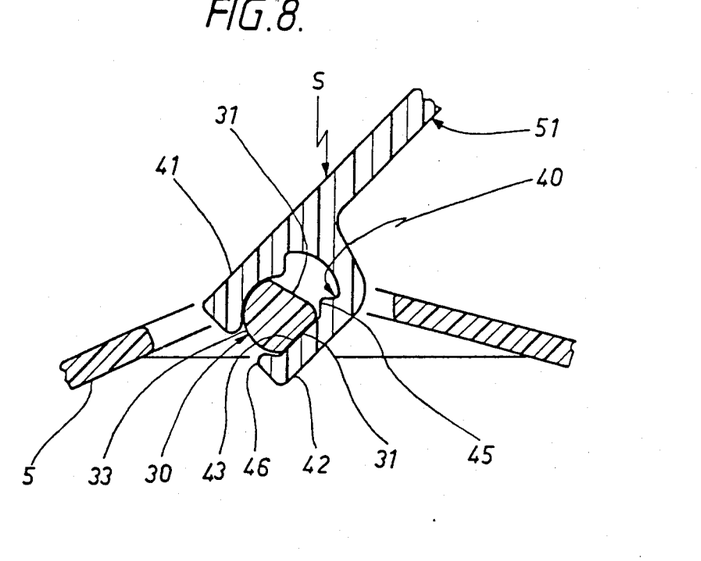
FIGS. 8 and 9 show to an enlarged scale a detail of FIG. 6 in position S and position T respectively.
Figure 9:
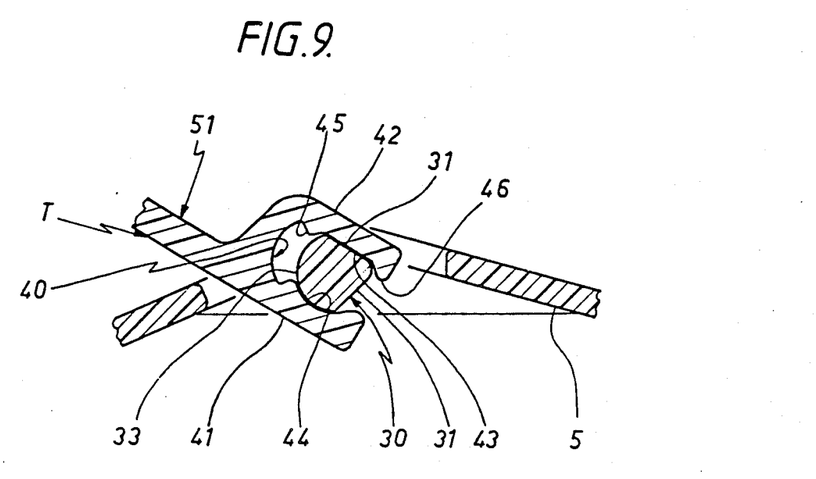

Each baffle 51 is associated with two coaxial rotary pairs which form said hinge.

Each rotary pair comprises a horizontal pivot 30 rigid with the base 5, and a corresponding seat 40 rigid with the lower edge of the baffle 51 to contain the pivot 30 as an exact fit.

The cross-sectional shape of the piot 30 corresponds to a circle cut by two chords to define an arched portion 33 joined to two straight sides 31 enclosing an angle of about 90 degrees. The ideal straight line joining the vertex of the angle between the sides 31 to the central point of the arc 33 is substantially parallel to the general direction in which the body 1 extends.

The seat 40 has a bifurcated sectional shape defining two elastically flexible branches 41 and 42. In section, the branch 41 comprises an arched inner side 44 arranged to engage with the arched portion 33, whereas the branch 42 comprises an inner straight side 43 arranged to engage with the sides 31 of the pivot 30. The engagement between the pivot 30 and seat 40 is obtained by forcing the pivot 30 between the arms 41 and 42, which open elastically during this insertion, to subsequently maintain an elastic pressure on the pivot 30.

On rotating the baffle 51, when the side 43 engages (or lies against) each of the sides 31 of the pivot 30 a stable position is attached. These positions correspond to said positions S and T.

The inner side 43 is bounded by a small inner projection 45 and a small outer projection 46 which are arranged to embrace the pivot 30 in order to prevent the pivot 30 separating from the seat 40.

The pivots 30 are disposed along the centre line of a like number of slots 35 provided in the base 5 to allow passage of the branches 41 and 42.

Numerous constructional modifications can obviously be made to the invention concerned, but without leaving the scope of the inventive idea as claimed hereinafter.

I claim:

1. A container-classifier for flat articles, in particular for computer disks, which comprises a container body (1) of essentially flat form for containing said articles and having an upper end, a cover (2) hinged to the upper end of said container body, said cover (2) and said container body (1) being hinged together while said cover (2) is capable of rotating rearwardly from a closure position through an angle exceeding 180 degrees, said container body (1) having a base surface (5), said container body (1) comprising one or more thin baffles (51) arranged to define several compartments in said container body (1), each baffle (51) being hinged along an axis located on said base (5) of said container body (1), each baffle having a lower edge, said container-classifier comprising for each baffle (51) one or more coaxial rotary pairs, each rotary pair comprising:

a horizontal pivot (30) ridge with said base (5) and having a cross-sectional shape comprising at least one straight side (31);

a seat (40) rigid with said lower edge of said baffle (51) and positioned to contain said pivot (30) as an exact fit, said seat having a bifurcated sectional shape defining two elastically flexible branches (41 and 42), one of which comprises a substantially straight inner side (43) arranged to engage with said straight side (31), whereby when the pivot (3) is forced between the branches (41 and 42) and said pivot (30) is engaged in said seat (40), said baffle is capable of assuming several stable angular positions, said stable angular positions being determined by the engagement between the straight side (43) of the seat (40) and the straight side (31) of the pivot (30).

2. The container-classifier according to claim 1 wherein said cover rotates rearwardly from said closure position to a rest position supporting said container body (1) in an inclined position.

3. The container-classifier as claimed in claim 2 wherein said cover (2) has an upper edge (12) and comprises two lateral lugs (11) at the upper end thereof, said lugs pivoting to the upper end of the container body(1), said edge (12) of the upper end of the cover (2) abutting against said base surface (5) of the container body (1) when the cover (2) is in said rest position.

4. The container-classifier according to claim 3 which comprises means for stabilizing said rest position, said means comprising one or more hooks (15) joined to said base surface (5) of said container body (1) in the region in which said cover (2) abuts against said surface (5), said hooks projecting from said surface (5) and being disposed in such a position that the ends intercept the trajectory of the edge (12) of said upper end of said cover (2) when said cover is moved into said rest position, said hooks (15) further extending towards said edge (12) and opposing rotation of the cover (2) in the opposite direction.

5. The container-classifier as claimed in claim 1, comprising two coaxial rotary pairs, each rotary pair comprises:
   a bearing element in the form of a through hole (18) provided in each of the two flat lateral walls (13) of said upper end of said container body (1);
   a pivot element rigid with said cover (2) and provided with an axial bore (19), and inserted into said bearing element with an exact fit;
   a circular cylindrical surface portion (20) rigid with said flat wall (13) and having its generating lines parallel to the axis of the rotary pair and disposed in proximity to said through hole (16) and concentric therewith;
   a stop element (21) formed of a first portion (22) inserted with a force fit into said bore (19) of the pivot element and rotating rigid therewith, and a second portion (23) of greater diameter than said first portion (22) and arranged to prevent axial withdrawal of the pivot element from the bearing element, said second portion (23) being provided with a radial projection (24) arranged to make friction contact with said cylindrical surface portion (20) when the cover (2) is raised through a range of about 90 degrees from its closure position.

6. The container-classifier as claimed in claim 5 wherein in correspondence with said upper end the container body comprises a cylindrical concave portion (7) which extends beyond the base surface (5) of the container body (1) and which projects upwardly and rearwardly with an inclination of about 45 degrees, said concave portion (7) having a profile in the form of a rectangle surmounted by a semicircle, the lower element of said concave portion (7) being disposed substantially in the same ideal plane as that in which the remaining part of the container body (1) rests; said lateral lugs (11) of the cover being pivoted to the flat lateral walls (13) of said concave portion (7), and the edge (12) of the upper end of the cover (2) abutting against the base surface (5) of the container body (1) in proximity to the region in which said concave portion (7) joins the remaining part of the container body (1), said through-hole (18) is provided in the flat lateral walls (13) of said cylindrical concave portion (7), said circular cylindrical surface portion (20) forming part of the circular cylindrical surface of said concave portion (7).

7. A container-classifier for flat articles in particular for computer disks, which comprises:
   a container body (1) of essentially flat form for containing said articles;
   a cover (2) hinged to the upper end of the container body (1);
   said cover (2) and said container body (1) being hinged together while said cover (2) is capable of rotating rearwardly from a closure position through an angle exceeding 180 degrees, said container body (1) having a base surface (5), said covering having an upper edge (12), said upper edge (12) abutting said base surface (5) when the cover is in the rest position and the container body (1) in an inclined position, with the open face thereof in view;
   means for stabilizing said rest position, said cover (2) comprising two lateral lugs (11) disposed in correspondence with the upper end thereof, said lugs pivoting to the upper end of said container body (1), said means for stabilizing the rest position comprising one or more small hooks (15) joined to said base surface (5) of the container body (1) in the region in which the cover (2) abuts against the surface (5), and project from said surface (5), the ends thereof intercepting the trajectory of the edge (12) of the upper end of the cover (2) when said cover is moved into said rest position, said hooks (15) further extending towards said edge (12) and hook therewith, and oppose rotation of the cover (2) in the opposite direction.

8. A container-classifier for flat articles in particular for computer disks, which comprises:
   a container body (1) of essentially flat form for containing said articles;
   a cover (2) hinged to the upper end of the container body (1);
   said cover (2) and said container body (1) being hinged together while said cover (2) is capable of rotating rearwardly from a closure position through an angle exceeding 180 degrees, said container body (1) having a base surface (5), said covering having an upper edge (12), said upper edge (12) abutting said base surface (5) when the cover is in the rest position and the container body (1) in an inclined position, with the open face thereof in view;
   means for stabilizing said rest position, and two coaxial rotary pairs with which the cover is hinged to the container body, each rotary pair comprises:
   a bearing element in the form of a through-hole (18) provided in each of the two flat lateral walls (13) of the upper end of the container body (1);
   a pivot element rigid with the cover (2) and provided with an axial bore (19), and inserted into said bearing element with an exact fit;
   a circular cylindrical surface portion (20) rigid with said flat wall (13) and having its generating lines parallel to the axis of the rotary pair and disposed in proximity to said through hole (18) and concentric therewith;
   a stop element (21) formed from a first portion (22) inserted with a force fit into the bore (19) of the pivot element and rotating rigid therewith and a second portion (23) of greater diameter than the first portion (22) and arranged to prevent axial withdrawal of the pivot element from the bearing element, said second portion (23) being provided with a radial projection (24) arranged to make friction contact with said cylindrical surface portion (20) when the cover (2) is raised through a range of about 90 degrees from its closure position (A).

* * * * *